United States Patent [19]

Hagen

[11] E Re. 31,111

[45] Reissued Dec. 28, 1982

[54] WAVE DRIVEN GENERATOR

[75] Inventor: Glenn E. Hagen, New Orleans, La.

[73] Assignee: Williams, Inc., New Orleans, La.

[21] Appl. No.: 32,162

[22] Filed: Apr. 23, 1979

Related U.S. Patent Documents

Reissue of:

[64] Patent No.: 4,077,213
Issued: Mar. 7, 1978
Appl. No.: 657,892
Filed: Feb. 13, 1976

[51] Int. Cl.[3] ..... F03B 13/12

[52] U.S. Cl. ..... 60/500; 60/501; 417/331

[58] Field of Search ..... 60/497, 500, 501, 505, 60/506; 417/331, 332, 333, 337; 290/53

[56] References Cited

U.S. PATENT DOCUMENTS

| | | | |
|---|---|---|---|
| 882,883 | 3/1908 | Hillson | 60/501 X |
| 917,411 | 4/1909 | Casella et al. | 60/501 X |
| 1,567,470 | 12/1925 | Settle | 60/501 X |
| 3,487,228 | 12/1969 | Kriegel | 417/331 X |
| 3,758,788 | 9/1973 | Richeson | 60/500 X |

*Primary Examiner*—Allen M. Ostrager
*Attorney, Agent, or Firm*—Arthur M. Dula

[57] ABSTRACT

A plurality of different sized floats are connected into an array through nonlinear interfaces so their relative motions drive hydraulic pumping means. Floats in the array are sized to present a "black body" to the ocean waves incident upon the array. Fluid moved by the pumping means is used to drive an electric turbogenerator.

52 Claims, 9 Drawing Figures

WAVE DRIVEN GENERATOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to wave engines and more particularly relates to wave engines used to drive electric generators. Specifically, the present invention relates to wave driven generators using a plurality of different sized floats to present a black body to the incoming wave energy whereby wave energy is nonlinearly coupled into hydraulic pumping means.

2. Background of the Prior Art

It has long been known in the art of power generation to use the potential energy available in ocean waves to lift a float. A [truely] *truly* amazing variety of ingenious mechanical linkages have been developed in an attempt to efficiently capture the energy of ocean waves. See, for example, U.S. Pat. Nos. 562,317, 632,139, 694,242, 738,996, 886,883, 917,411 and 986,629. All of these early patents rely upon mechanical linkages between fixed floats to trap the rocking, lifting, falling or longitudinal motions of waves. All of the engines disclosed in these patents are mechanically complex and highly inefficient.

While all the above cited references depend on the potential energy of waves to develop motive power, some wave motors in the past taught the use of the wave's kinetic energy. See, for example, U.S. Pat. No. 1,072,272.

A careful study of the prior art shows that most historical wave motors utilize either (1) the kinetic energy of waves by devices such as paddle wheels, or (2) the wave's potential energy by a float or a series of floats. Few devices utilize both forms of energy.

The prior art, insofar as it relates to wave engines that rely upon the lifting power of waves, i.e., its potential energy, rely either on a single float, for example U.S. Pat. Nos. 1,202,742, 1,471,222, 1,647,025, 1,746,613, 1,953,285 and 1,962,047, or utilize a series of floats of the same size, for example U.S. Pat. Nos. 1,925,742, 1,867,780, 1,688,032, 1,567,470, and 1,408,094. Additionally, many early wave motors are extremely complex mechanically. For example, see U.S. Pat. Nos. 1,528,165, 1,169,356, and 1,818,066.

All prior art wave motors teach the direct linear coupling of the float's motion through either mechanical or hydraulic means to the motion of a shaft or piston. As a result, all such wave motors had to be very rugged and heavy to withstand the wide spectrum of wave energy incident upon them. For example, one wave motor installed in Atlantic City, N.J. consisted of six foot cylinder floats 4 feet high. Each float weighed about 3,100 pounds and was lifted two feet by waves 11 times per minute. They drove a horizontal shaft by means of chains and rachets, developing about 11 horsepower, steadiness being obtained by the use of heavy flywheels. The inefficiency, capital cost and complexity of this and all prior art wave motors caused them to be unsuccessful. (Power, Jan. 17, 1911). (A similar wave motor was proposed by Smith in Mechanical Engineering, September, 1927 at page 995.)

The most modern wave motors taught by the prior art does not differ significantly in its manner of operation from wave engines taught at the beginning of this century. See, for example, U.S. Pat. No. 3,879,950, issued Apr. 29, 1975 to Kiichi Yamada for a wave generator to be used in conjunction with an offshore nuclear power plant. This modern wave motor uses a plurality of identical floats whose motion is coupled linearly to a series of pneumatic pistons. Unfortunately, such a linearly coupled collector cannot efficiently trap wave energy.

Waves in the ocean vary in amplitude, or wave height, from a fraction of a foot to over 50 feet and in frequency from a wave length of less than 5 feet to over 1,000 feet. To extract the maximum potential energy from any given wave, a float must be capable of dynamically coupling to the wave's movement. A given size float will respond most efficiently to only one wave length. To be efficient, a wave motor must provide a plurality of different size floats capable of coupling efficiently into a broad spectrum of differing wavelengths, i.e., to all the waves from which power must be efficiently extracted. Broadly, this concept is called "resonance".

In addition to resonance with a broad spectrum of wavelengths, the floats of an efficient wave motor must be capable of extracting power from both low and high amplitude waves. Because waves differ in amplitude by as much as two orders of magnitude, any device that extracts power by linearly coupling wave movement to gears or pistons will have to be inefficient in extracting power from either the high or low amplitude end of the wave power spectrum.

Theoretically, [an] *a* single float acting alone, even if it is the proper size, can only absorb about one third of the available power from a wave incident upon it. This is caused by the fact that a third of the wave's energy is absorbed by the float, a third is reflected back from the float and the final third is transmitted through the float to its attached structures. This fact, as well as the fact that wave motors taught by the prior art do not couple efficiently into either the frequency or amplitude spectrum of ocean waves, have caused all prior art wave motors to be very inefficient.

It is an object of the present invention to teach a wave engine that is capable of extracting hydraulic power efficiently from a wide variety of wavelengths of ocean waves.

It is a further object of the present invention to provide a wave engine that couples into the amplitude spectrum of ocean waves in a nonlinear manner so as to efficiently extract power from both high amplitude and low amplitude waves.

It is yet a further purpose of the present invention to provide a wave generator whose multiple floats act together to form a black body trapping all incident wave energy.

It is yet another purpose of the present invention to provide a wave engine having an assemblage of different size floats that function together as a wave trap to convert approximately 80% of the wave energy incident upon it to hydraulic power.

Yet a final purpose of the present invention is to provide a wave motor that can easily be scaled up to provide a large amount of power cheaply and that is simple enough to require a low level of maintenance.

After an extended search at the Patent Office, the closest art found to the present invention is U.S. Pat.

No. 1,757,166 covering an apparatus and method of obtaining power from ocean waves. However, even this prior art teaches the use of a plurality of single unconnected floats of the same size. No prior art found by the inventor teaches the advantages of tying together a group of floats in an array to form a wave trap to capture reflected and transmitted wave energy. Also, no prior art found by the inventor teaches the nonlinear coupling of the floats to their associated power extraction devices.

SUMMARY OF THE INVENTION

The present invention is an array of floats that would be anchored to the ocean floor some distance off shore. The optimum distance offshore will generally be beyond the point where the ocean grows so shallow that a significant portion of wave energy is dissipated in turbulence. These floats are arranged so waves impinge first upon the smallest floats of the array. These smallest floats are pivotally connected to progressively larger floats. The floats are also connected by hydraulic pumping means, such as hydraulic cylinders or tubes and pressure plates. These hydraulic pumping means are nonlinearly responsive to any relative motion between the floats. As larger amplitude waves strike the floats each additional increment of relative motion between the floats does proportionately more work and moves an incrementally greater amount of hydraulic fluid. The undulating action of the array of floats is thus converted to moderate pressure hydraulic energy which can then be used to operate a turbogenerator.

The smallest float in the array must be approximately half the size of the smallest wave from which energy is to be efficiently extracted. The largest float should be approximately one-half the wave length of the largest wave the system will significantly attenuate.

The most significant differences between the present invention and those wave engines taught by the prior art is as follows:

1. The present invention employs an array of floats of different sizes. This array extracts energy from a wider frequency spectrum of waves than was taught by the prior art.

2. The relative motion of floats in the present invention is converted to hydraulic energy nonlinearly. This allows the array of floats to respond efficiently to very low amplitude waves by presenting very little resistence to them while still responding very efficiently to high amplitude waves by presenting a great deal more resistance to incremental [amount] *amounts* of relative motion caused by them.

3. Finally, the use of a plurality of floats coupled together in an array allows the present invention to trap the wave energy that would otherwise be lost by reflection or transmission from the individual floats. In the present invention, the portion of wave energy transmitted by the float forms a portion of the total energy incident upon other floats in the array. The energy reflected from a float also, except at the perimeter of the array, forms a portion of the energy incident upon the other floats. Thus a wave incident upon the array is trapped in it and the array functions as a black body to efficiently absorb all incident wave energy.

As a result of this efficient absorption of wave energy the area directly behind the array is relatively calm. The floating array of wave engines taught by the present invention will thus function as a floating breakwater, although this is not a primary purpose of the invention.

DESCRIPTION OF THE PREFERRED EMBODIMENT

Figure 1:
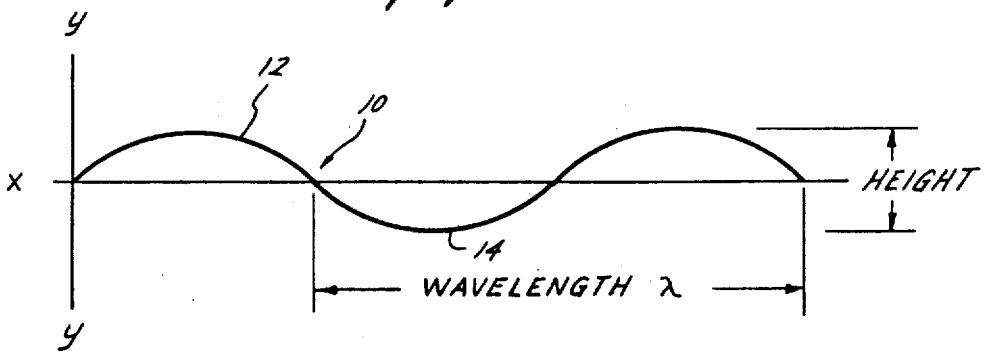
FIG. 1 is a schematic cross sectional view of an idealized wave.

FIG. 1 shows an idealized ocean wave seen in cross section. Wave 10 has crest 12 and trough 14. The distance between two crests or two troughs is known as the "wavelength" of the wave and is a function of the wave's total energy. The height or amplitude of the wave is defined as the difference between the crest and trough of the wave. Total wave energy is also a function of wave height.

The total energy of a wave, expressed in horsepower per foot of wave breadth, i.e. per foot of wave front incident upon an array of floats, is found by the equation:

$$\text{Total Energy} = 0.0329 \times H^2 \times L[1 - 4.935\,(H^2/L^2)]$$

where H is the height of the wave in feet and L is the wave length, also in feet. Albert W. Stahl, U.S.N., Transactions, American Society of Mechanical Engineering, Volume 13, page 438.

The British Admiralty Weather Manual classifies wave height as follows:

TABLE A

| Description of Sea Disturbance | Mean Height of Waves m | Mean Height of Waves ft |
|---|---|---|
| calm; glassy | 0 | 0 |
| calm; rippled | 0.2 | 0.5 |
| smooth; wavelets | 0.3–0.8 | 1–2.5 |
| slight | 1.5 | 5 |
| moderate | 3 | 9 |
| rough | 4 | 14 |
| very rough | 6 | 19 |
| high | 8 | 15 |
| very high | 9–11 | 31–37 |
| exceptionally high | 14 | 45 or over |

The usual type of North Atlantic wave has a wave length from 160 to 320 feet, occasionally attaining 500 to 600 feet, and a speed that ranges from 25 to 35 knots. In the South Pacific waves with wavelengths up to 1,000 feet and speeds up to 50 knots are to be found. Illustrations in the remainder of the discussion of the present invention will be confined to moderate waves having heights between 5 and 15 feet and wavelengths between 100 and 300 feet. The reason for this limitation is not due to any limitation on the present invention, but is a convenience because such waves are the average waves found off the North Atlantic coast of the United States.

Figure 2:
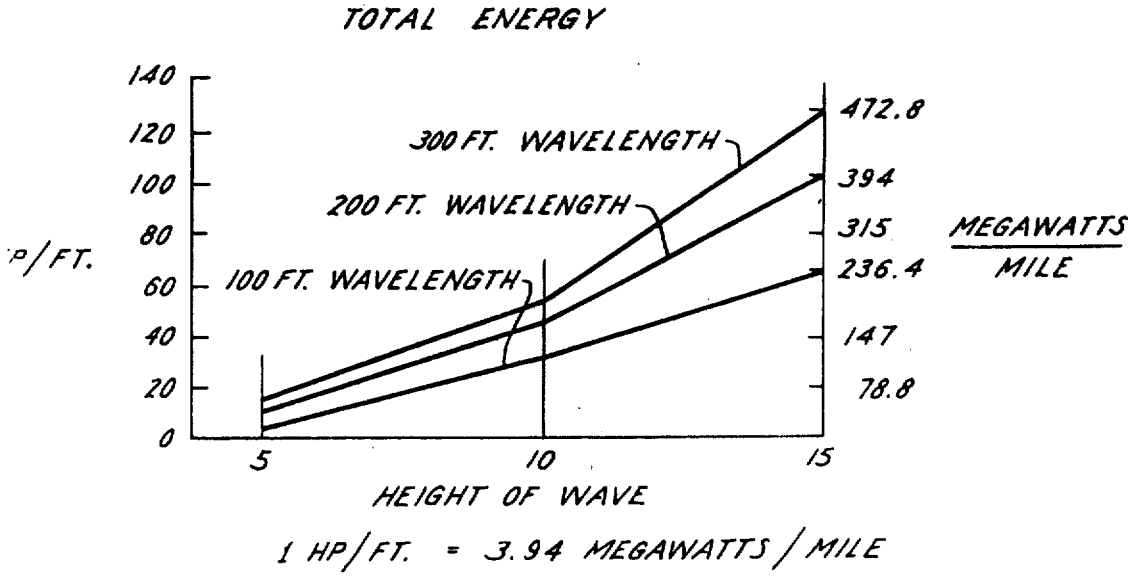
FIG. 2 is a graph showing the total energy contained in ocean waves for given wave amplitudes and wave lengths.

FIG. 2 is a graph showing the energy contained in ocean waves having wave [height] *heights* between 5 and 15 feet and wavelengths between 100 and 300 feet. This representation was obtained by using the value for the total energy of the wave, determined by the equation shown above, to yield the horsepower per foot of wave breadth and then converting from horsepower per foot to megawatts per mile. (There are 3.94 megawatts per mile in a wave that has a total energy of one horsepower per foot.) To gain perspective, the largest nuclear power generating facility in the United States is capable of generating approximately a thousand megawatts.

The values of total energy given in megawatts per mile in FIG. 2 will be used throughout the rest of this specification. It should be understood that these figures are chosen only for convenience because they represent typical wave heights and wavelengths for average size waves in the Atlantic. "Modern Studies of Wind Generated Waves", Volume 8, Contemporary Physics, pages 171-183, March 1967. Also see, R. A. R. Tricker, Boars, Breakers, Waves and Wakes: An Introduction to the Study of Waves On Water (1965).

Figure 3:
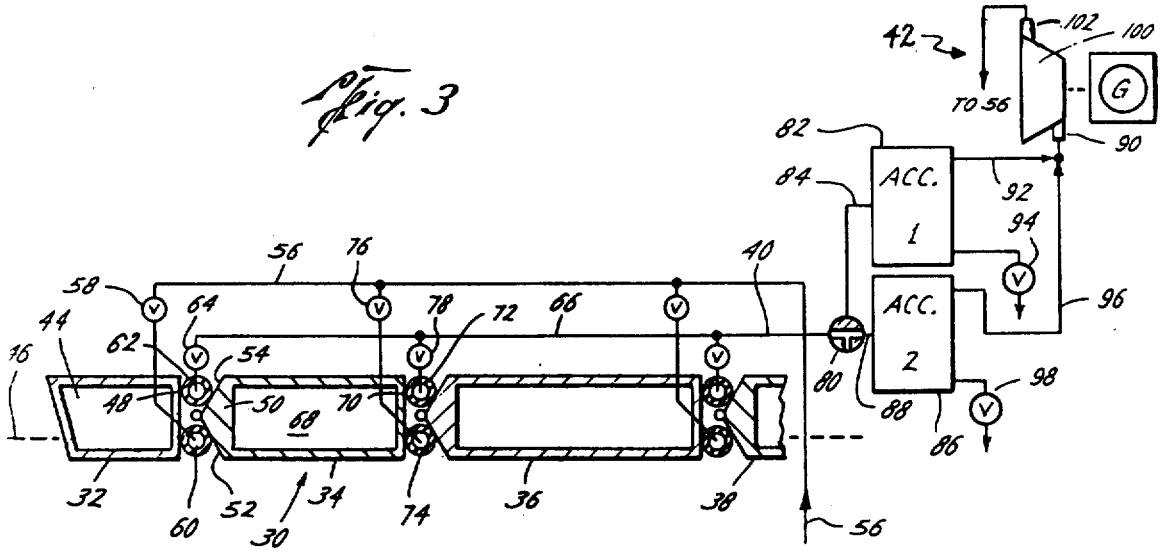
FIG. 3 is a cross sectional schematic view of a portion of a float array as taught by the present invention together with a schematic illustration of its associated hydraulic accumulators and generators.

FIG. 3 shows array 30 comprising first float 32, second float 34, third float 36 and a portion of fourth float 38. Array section 30 is connected by means of hydraulic line 40 to accumulator generator section 42. Float 32 is a hollow water tight member containing a [bouyant] *buoyant* cavity 44. The displacement of the float on water level 46 is determined by the size of [bouyant] *buoyant* cavity 44 according to well known hydrostatic laws. See generally Hydraulics, R. L. Daugherty, McGraw Hill 1937. Float 32 may be of any desired shape, but in the preferred embodiment a flat back plate 48 at its side proximate front 50 of float 34. The rear edges of float 32 are attached by a hinge, which will be described in connection with FIG. 4, to the front of float 34. The front of float 34 is provided with a pair of prismatic surfaces 52 and 54 on its lower and upper side, respectively.

Hydraulic fluid input line 56 is connected through one-way valve 58 to lower pump tube 60. Lower pump tube 60 lies between prismatic face 52 of the front of float 32 and the rear flat portion 48 of float 2. Likewise, upper pump tube 62 is located between upper prismatic face 54 of float 34 and the rear flat face 48 of float 32. Upper pump tube 62 is connected through one-way valve 64 to accumulator hydraulic feed line 66. Float 34 is approximately 26% longer than float 32. Likewise float 36 is approximately 26% longer than float 34. Similarly float 38 is approximately 26% longer than float 36. Except for the smallest front float, each succeeding float in this embodiment has an upper and lower prismatic front face and a vertical rear face that act together with pump tubes to pump hydraulic fluid. All the floats are connected together by simple hinges, which will be described in greater detail below.

Float 34 has [bouyant] *buoyant* space 68 and back flat face 70. Upper and lower pump tubes 72 and 74, respectively, lie between the upper prismatic face of float 36 and rear face 70 and the lower prismatic face of float 36 and rear face 70 respectively. As was described in connection with the upper and lower pump tubes between float 32 and 34, lower pump tube 74 is connected in fluid communication through one-way valve 76 with hydraulic supply line 56 and upper pump tube 72 is connected through one-way valve 78 in fluid communication with hydraulic accumulator line 66.

The hydraulic pump tubes between each pair of floats in the array are similarly connected to the hydraulic supply and accumulator hydraulic power line through one-way valves.

First hydraulic accumulator 82 is connected to three-way valve 80 by line 84. Second hydraulic accumulator 86 is connected to valve 80 by line 88. The first hydraulic accumulator is connected to turbine input 90 by line 92. First hydraulic accumulator 82 is also equipped with a dump valve 94. Second hydraulic accumulator 86 is also connected to turbine input 90, but by line 96. Second hydraulic accumulator is also equipped with a dump valve 98. Turbine input 90 is located at the high pressure input end of turbogenerator 100. Hydraulic fluid outlet 102 is on the low pressure side of turbogenerator 100.

Structurally, the floats shown in FIG. 3 may be made of any material that is watertight and [bouyant] *buoyant*. It is expected that the first test models of the wave motor will be made of wood while larger models will have floats made of concrete. The upper and lower pump tubes and all the hydraulic connecting tubing may be any type of hydraulic tubing capable of withstanding the 100 to 200 pounds of pressure per square inch generated by the hydraulic power collecting array of the present invention.

The floats and all hardware used to connect them together should be made of corrosion resistant material.

Functionally, working fluid, which may be water or any other convenient hydraulic fluid is drawn in through input line 56 through one-way valves 58 and 76 and into their respective lower pump tubes. As will be explained in greater detail in connection with the discussion of FIG. 6 below. Any relative movement of the floats places compressive force on these pump tubes and causes them to act as hydraulic pumps. The arrangement of one-way valves is very straightforward and is designed to prevent the fluid from flowing backwards when the relative motion of the floats reverses. As the amount of relative motion between the floats increases, each additional degree of rotation of a float about its pivotal connection with another float causes the flat back of the forward float to become more nearly parallel with the upper or lower prismatic face of its following float. The two surfaces also move together as the angle increases. A small amount of relative motion causes the pump tubes to pump a small amount of hydraulic fluid. Once this small amount of hydraulic fluid has been pumped, a further increase in relative motion of any two floats will pump an incrementally greater amount of hydraulic fluid. If a wave has sufficient amplitude to cause a yet further relative motion to occur between two floats, then the front surface of one float and back surface of the other will become more nearly parallel and will pump a still greater incremental volume of hydraulic fluid.

In very calm weather a small ripple of water will meet little resistance in absorber array 30 and will efficiently cause relative motion to occur between its floats. This relative motion will pump hydraulic fluid and thus energy will be effectively absorbed from low amplitude waves. During a storm, whenever high amplitude waves are available, very large amounts of relative motion will occur between float pairs in the array. This large amount of relative motion will be much harder to achieve and the array will thus effectively absorb *a* greater amount of energy available from higher amplitude waves.

Hydraulic fluid entering valve 80 may be selectively directed to either the first or second accumulator. It is the function of these hydraulic accumulators to even out surges of power coming from the array and to provide a steady hydraulic pressure to turbogenerator 100. The hydraulic accumulators are duplicated and placed in parallel so maintenance may be performed upon one without interrupting the supply of hydraulic power to turbogenerator 100.

Each float is 1.26 times (or 26%) longer than the preceding float because 1.26 is approximately the cube root of 2. Thus float length doubles every third float, and, by doubling the width of this third float, the array may be scaled up to any desired size without difficulty.

After hydraulic fluid has flowed through the turbogenerator and generated electricity, it may be returned to input line 56. The system may thus be closed. Alternatively, the present invention could be used to pump water from a body of water to an elevated reservoir. Water in the reservoir could then be run through an existing turbogenerator to generate power.

Figure 4:
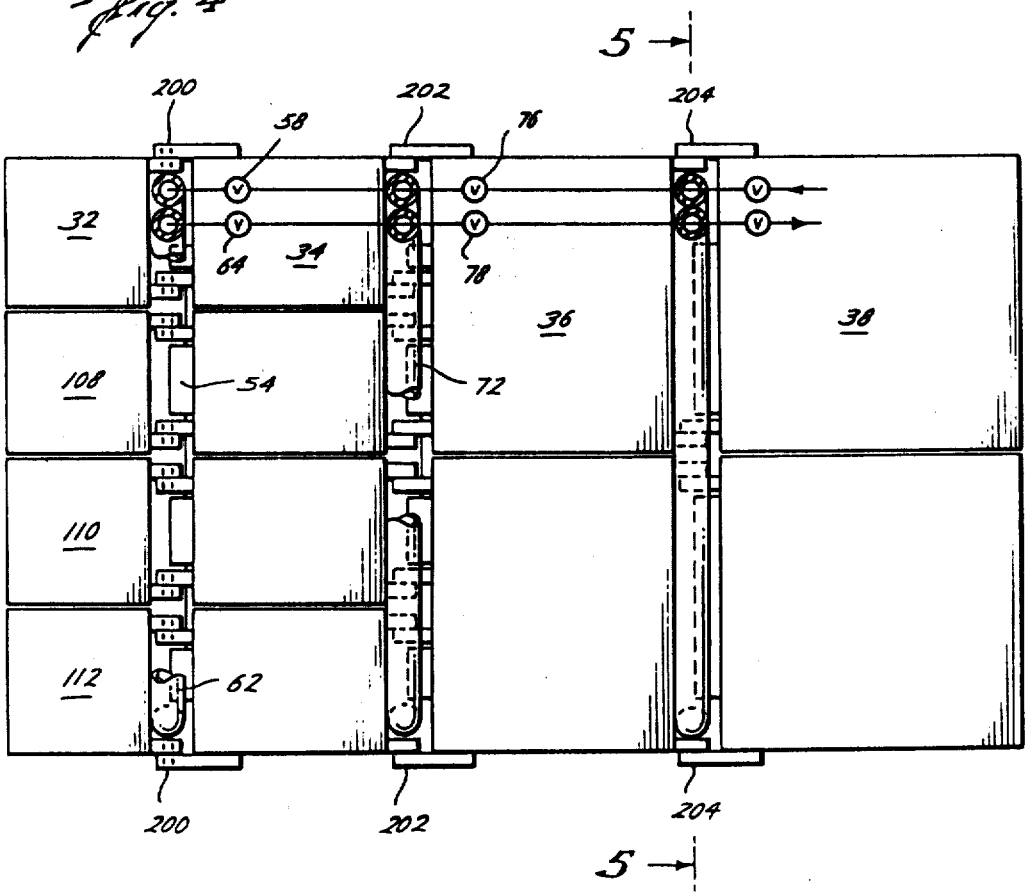
FIG. 4 is a vertical schematic view of the same section of the wave motor array as was illustrated by FIG. 3.
Figure 5:
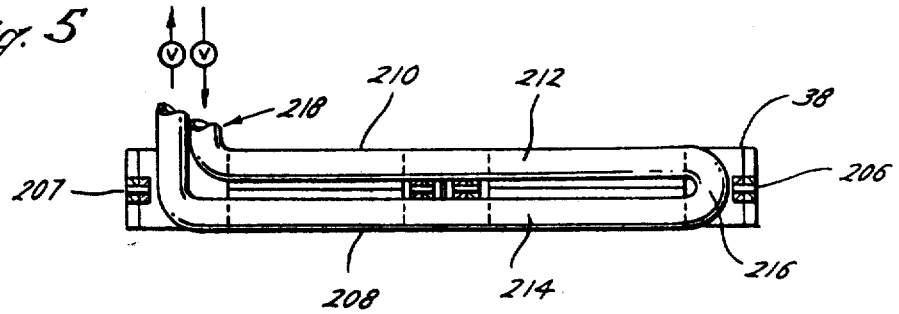
FIG. 5 is a view taken along section line 5—5 of FIG. 4 and illustrates one of the hydraulic pumping means taught by the preferred embodiment of the present invention.

FIG. 5 is similar to the structure shown in FIG. 4, as seen from above. Float 32 is connected by means of hinge 200, which may be any conveniently designed hinge, to float 34. Float 34 is connected by hinge 202 to float 36 and float 36 is connected by hinge 204 to float 38.

FIG. 4 shows how an array of floats is assembled. Floats 32, 108, 110 and 112 form the first rank of floats. They are connected by hinges (like hinge 200) at their edges to the edges and center of the next level of floats, in this instance floats 34 and 114. Upper pump tubes 62 and 72 are clearly shown between their respective pairs of floats.

When a wave strikes the first group of floats, some wave energy is absorbed when it causes relative movement of the floats and pumps hydraulic fluid. The incident wave's remaining energy is transmitted to larger floats. Some of this transmitted energy is relected and again perturbs smaller floats causing additional hydraulic pumping. Some of the transmitted energy is absorbed by causing relative motion in the next group of floats 34 and 114. This pumps additional hydraulic fluid. The remaining energy, however, is transmitted further to interact with float 36 and pump additional hydraulic fluid. Again, some of the transmitted energy is reflected back to floats 34 and 114 and to the smallest group of floats where it interacts to pump additional hydraulic fluid. The array functions as a wave trap and is significantly more efficient than any means taught by the prior art extracting hydraulic energy from movement of ocean waves. The preferred embodiment of the present invention can convert approximately 80% of the ocean wave energy incident upon its wave motor float array to hydraulic energy.

FIG. 5 shows a view along line 5—5 of FIG. 4. Hinge pivot 206 and 207 are provided to attach the front of float 38 to back hinge 204 of float 36. Lower prismatic face 208 and upper prismatic face 210 of the front of float 38 are obscured by upper pump tube 212 and lower pump tube 214 as shown. The upper and lower pump tubes are connected at end 216 and are attached at end 218 to their respective one-way valves, as described above.

Figure 6:
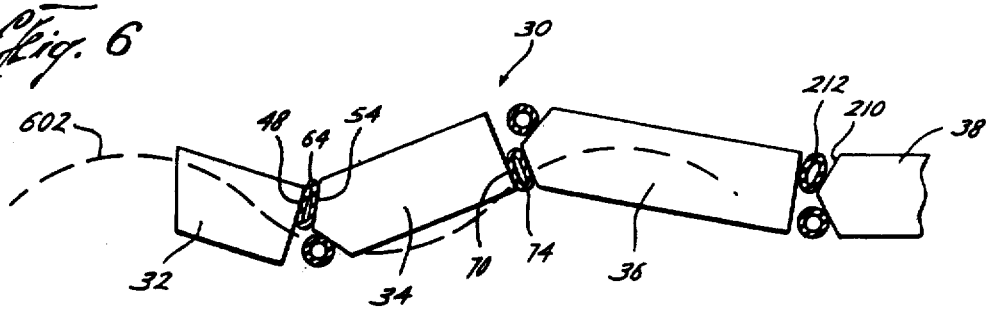
FIG. 6 shows schematically the inner action between a wave and a portion of a float array taught by the preferred embodiment of the present invention.

FIG. 6 shows the operation of the upper and lower pump tubes. As array 30 responds to wave 602, floats of array 30 are set into motion relative to one another. Float 32 has risen and float 34 fallen as they encounter a crest and trough of a wave, respectively. This causes back surface 48 to assume a position nearly parallel to front prismatic surface 54 of float 34. The pump tube being therebetween has been squeezed and its hydraulic fluid forced to move into hydraulic feed line 66 through valve 64 as described in the discussion of FIG. 3 above. As float 34 dropped, float 36 rose, to a lesser extent because of its larger size. Wave 602 is approximately the right size to couple efficiently into floats 34 and 36. Again, as the floats are set in relative motion, back surface 70 of float 34 squeezes lower pump tube 74 against the lower prismatic surface at the front of float 36.

By the time the wave reaches float 38 most of its energy has been consumed by the absorber array. However, it has raised float 36 slightly and thus set float 36 into relative motion with float 38. As the back surface of float 36 moves slighty toward upper prismatic surface 210 of float 38, upper hydraulic pump tube 212 is slightly deformed and pumps a small amount of hydraulic fluid through its associated check valve. The low amplitude wave is thus efficiently converted into hydraulic power.

Figure 7:
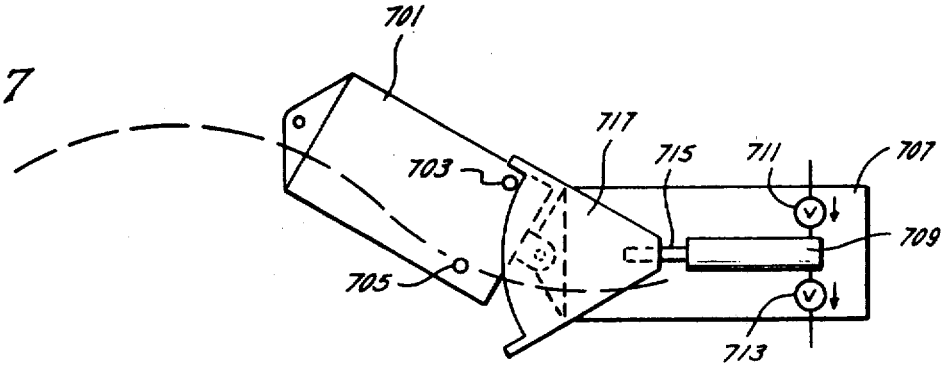
FIG. 7 shows an alternative hydraulic pumping means connecting two floats in an array as taught by the present invention.

FIG. 7 shows an alternative means of nonlinearly coupling pairs of floats making up a power absorbing array taught by the preferred embodiment of the present invention. In FIG. 7, float 701 has an upper pin 703 and a lower pin 705 located on the side of the float near its back plate. Float 707 has mounted on its side a single action hydraulic cylinder 709, which is associated with an input check valve 711 and output check valve 713. Valve 711 is connected at its input end to a source of hydraulic working fluid and valve 713 is connected at its output end to a hydraulic accumulator as taught in FIG. 3. Single action hydraulic cylinder 709 has a piston rod 715 which is connected and rigidly affixed to a triangular plate 717. As float 701 moves relative to float 707, as is shown in FIG. 7, either upper pin 703 or lower pin 705 will engage triangular plate 707 and thus depress piston rod 715. This will cause hydraulic cylinder 709 to pump hydraulic fluid.

The advantage in using a single acting cylinder rather than a double acting type is that the latter must have a shaft seal so it can compress on both ends. This makes it much more expensive. Double acting pistons are also more maintenance prone because the shaft is exposed to corrosive salt spray.

Functionally, a very slight movement of float 701 will cause only a very slight travel of piston rod 715. The amount of travel of the piston rod accomplished per unit of relative motion of the floats is a direct function of the cosine of the angle generated between two floats. Thus, as floats enter into greater relative motion, each additional increment of relative motion produces an incrementally greater travel of the piston rod. The hydraulic piston is nonlinearly responsive to relative motion of the two floats. Because the piston rod will be traveling a greater distance when the angle between the two floats is greater, a wave of high amplitude will have to expend more energy to cause greater relative motion.

This arrangement is described as an alternative to the pump tube arrangement described above because it may be more suitable for certain applications of the present invention. Any nonlinear coupling means, however, will practice the present invention. A good engineer could certainly produce many alternate drives and linkages without departing from the scope of the present invention.

Figure 8:
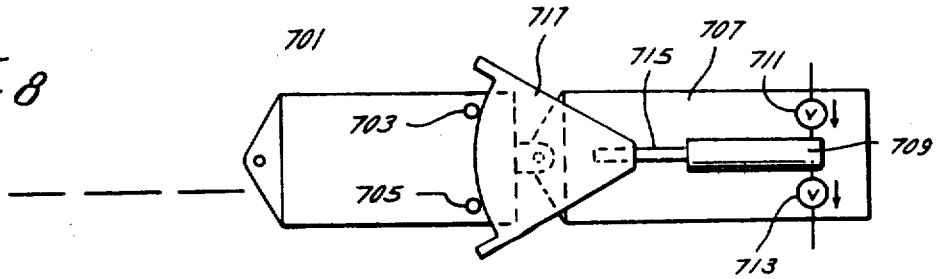
FIG. 8 is another view of the embodiment of the present invention shown in FIG. 7.

FIG. 8 shows the embodiment of the present invention as illustrated in FIG. 7 sitting in calm water. Like numbers denote like parts in both drawings.

Functionally, this alternative means of nonlinearly extracting power from floats in an array allows a single action hydraulic cylinder to pump hydraulic fluid regardless of the direction of relative motion between the two floats. This is much less expensive than, for example, using two hydraulic cylinders and depending on each one to pump when relative motion between the two floats is in a given direction.

Turbine 100 shown in FIG. 3 would preferably be a "Pelton wheel". This type of turbine is characterized by its ability to maintain synchronous rpm so long as pressure is constant, but it can accommodate a widely varying flow rate of water by simply varying the orifice size of its nozzle. Size of this orifice would preferably be controlled by pressure in the accumulator. A servoloop is established to hold exactly a given pressure, such as 100 psi., in the system. This has the advantage of keeping the hydraulic system independent of the electrical system and prevents a failure of hydraulic power if electric power is lost.

The generator would preferably be a converter type with a DC commutator on one end and AC slip rings on the other. This type of generator is old in the art of electrical power engineering and is being described in schematic form merely to show its use in conjunction with the present invention. The DC portion of the generator feeds a bank of batteries that act as a stabilizer. The rpm of the generator may be controlled by varying the amount of mechanical load it places on the turbine. This may be done by allowing a tachometer measuring turbogenerator rpm to control generator field current. If the turbine begins to speed up, the tachometer increases generator field strength. This increases DC output voltage, increases load on the turbine and brings it back down in speed to a proper rpm to generate synchronous AC current. This servo control loop is entirely independent of the rate of arrival of hydraulic energy.

Finally, the AC portion of the generator is fed to a shore power grid by means of a variable transformer. This yields a final servo control loop. The variable transformer can vary the rate at which power is sent into the power grid. This rate is controlled by the condition of the battery bank. If the batteries are full and charging, then AC output to shore is maximized. Thus whatever power is available in the power station can be transmitted to shore to the land power grid.

The principle objection to the commercial use of wave generators is twofold. First, such generators are expensive to build. Secondly, they are highly inefficient and can not be scaled up efficiently to generate large amounts of power.

The present invention avoids these difficulties by providing a wave motor that is designed to be scaled up to any size by building a plurality of modular units that will interact as a wave trap to increase the efficiency of the entire collector array. Secondly, by acting as a wave trap and thus converting approximately 80% of incident wave energy to useful hydraulic power, rather than the 30% maximum taught by prior art, the present invention is efficient.

Figure 9:
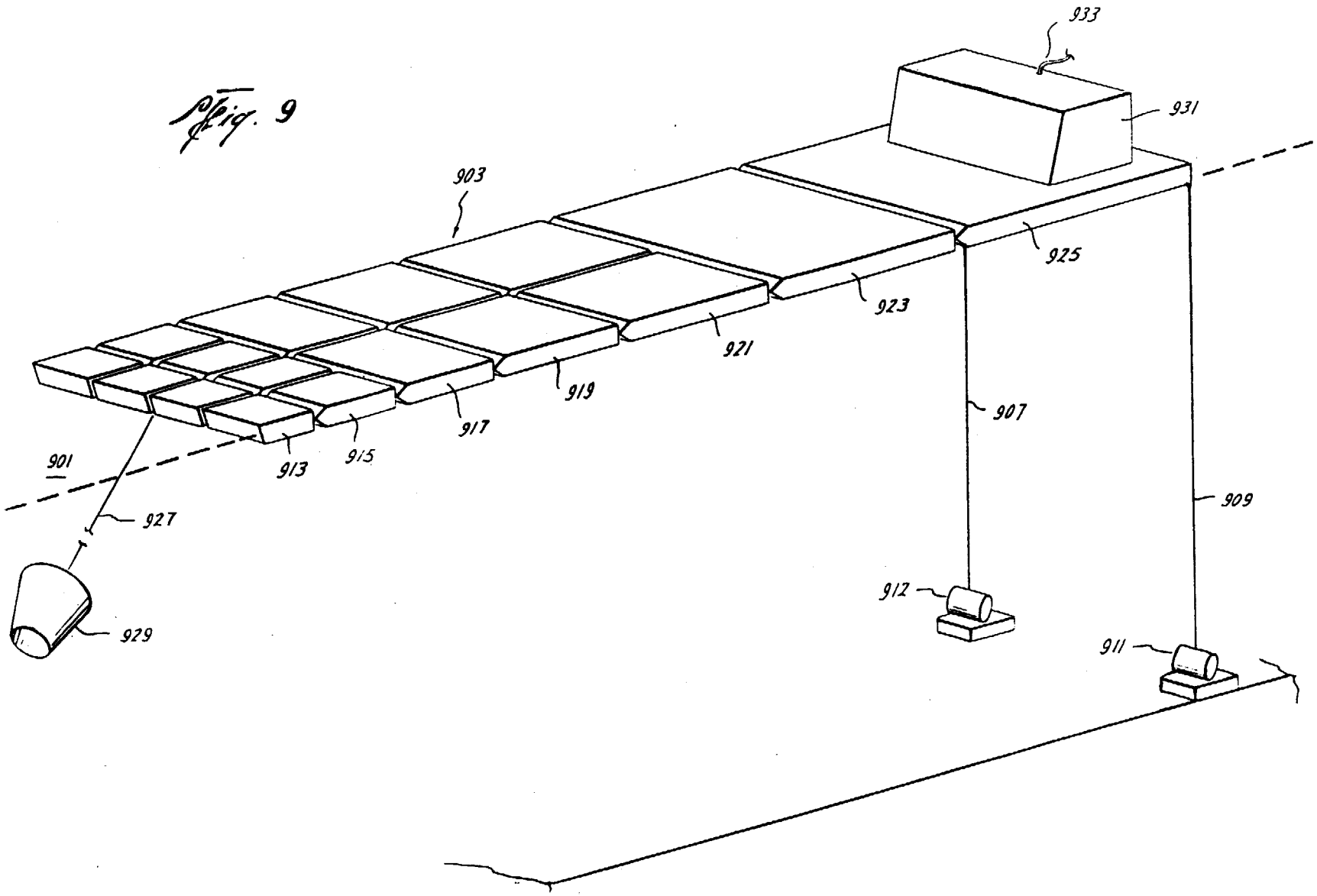
FIG. 9 is an isometric view of a typical power generating array, one module of a power generating system, constructed according to the preferred embodiment of the present invention.

FIG. 9 shows an isometric view of a typical power generating array constructed according to the preferred embodiment of the present invention. This array would be one module of a power generating system.

Array 903 comprises a plurality of floats. The first rank of floats 913 comprise four floats, each 100 feet × 100 feet × 20 feet. Unless otherwise described, all floats in this example are 20 feet thick. The four floats in rank 913 are pivotally connected at their rear end to the front end of float rank 915. Float rank 915 is also made up of four floats, each of which is 126 feet × 100 feet. The four floats in float ran 915 are pivotally connected, as was described in connection with FIG. 4 above to float rank 917. Float rank 917 comprises two floats, each of which is 156 feet long by 200 feet in width. Each of the floats in float rank 917 is connected to two of the floats in float rank 915. Each of the floats in float rank 917 is also pivotally connected at its rear to the front of float rank 919, which also comprises two floats. Each of the floats in float rank 919 is 200 feet × 200 feet.

It should be noted that this array is a good example of how the preferred embodiment of the present invention can be scaled up to simply make a large wave generator.

The floats in rank 913, 915, 917 and 919 form an array exactly like the array discussed in connection with FIG. 4 above. Each of the two floats in float array 919 can then be considered as the first floats on the larger array comprising ranks 919, 921, 923, and 925. If larger floats were required, the float in rank 925 could be attached to even larger *floats* and the scaling up could increase to any desired degree. Conversely, if it was desired to gather power from even smaller waves, then front rank 913 could be attached at its front end to smaller floats.

Float rank 919 comprises two floats that are 200 feet long by 200 feet wide. Each of these is pivotally connected at its rear to float rank 921 which comprises two floats each of which is 252 feet long by 200 feet wide. The two floats in float rank 921 are pivotally connected at their rear to the single float in float rank 923 which is 400 feet wide and 312 feet long. This float is connected at its rear pivotally to the float in float rank 925, which is the terminal float in this array and is 400 feet long by 400 feet wide.

Turbogenerator housing 930 is attached to the upper surface of float 925 and delivers power to shore through power line 933. The rear of float 925 is anchored at its rear edges by lines 907 and 909 to two remotely operated winches which are firmly attached to the sea floor beneath the collector array.

Sea level in this illustration is indicated by dotted line 901.

This collector array is shown individually and, as such, is far longer than it is wide. In actual operation, a number of these arrays would be hooked together side by side and their floats would be pivotally attached to one another. This plurality of float arrays, all anchored at their rear extremity by winches, would be very stable ınd would stay pointed into the direction of wave mo-
:ion. For the purpose of this illustration only, a sea
ınchor 929 is shown attached by line 927 to the front of
:he collector array. The purpose of this sea anchor is to
ıold the front of the array into the wind.

Functionally, all of the floats in this example are
:onnected by nonlinear hydraulic pumping means, as
were described in connection with FIGS. 5, 6, 7 and 8
above. These are not shown in FIG. 9 for the purpose of
:larity. It should be understood that any nonlinear cou-
pling means may be used to operationally connect the
floats in this array to their respective hydraulic pump-
ing means.

The array shown in FIG. 9 would be most efficient in
collecting power from waves having wave lengths of
between 100 and 400 feet. A turbogenerator is placed
within a housing 931 on the rear most float of collector
array 925 to minimize power loss due to hydraulic fric-
tion in the hydraulic lines. Float 925 is considerably
larger than a football field and should carry a turbogen-
erator on its surface with no difficulty. The purpose of
winches 912 and 911 is to compensate for tidal activity
and to allow the array to ride out a large storm.

The entire array 903 is approximately 400 feet wide
by 1500 feet long. As was mentioned before, all of the
floats in this example are 20 feet thick. A power gener-
ating array that would intercept 10 miles of waves
would require 132 of these array modules. More specifi-
cally, such an array would require 528 floats that are
100 feet×100 feet; 528 floats that were 128 feet×100
feet; 264 floats that were 200 feet×156 feet; 264 floats
that were 200 feet×200 feet; 264 floats that were 200
feet×252 feet; 132 floats that are 400 feet×316 feet and
132 floats that are 400 feet×400 feet. The use of a large
number of identical floats is advantageous because it
greatly reduces the construction cost of each float. Such
a collector array, if it used standard array modules as
illustrated by FIG. 9, would also require 264 subsea
winches and 132 turbogenerators.

Given typical conditions in the North Atlantic, i.e.,
wave heights of from 5 to 15 *feet* and wave lengths from
100 to 300 feet, 23.86 megawatts of power would be
instant upon the array module shown in FIG. 9. Of this,
19 megawatts would be converted by the collector
array to usable hydraulic power. If we assume 50%
losses in the hydraulic collecting array and in the turbo-
generator 931, then, on the average, the array turbogen-
erator would put out 9½ megawatts through power line
933 to the shore power grid.

To give a commercial example, if a generating unit
built according to the preferred embodiment of the
present invention intercepts ten miles of wave front and
these waves are of average size for the North Atlantic
(wave height of 12 feet, wave length of 200 feet), then
the total wave power falling on the collector array will
be 315 megawatts per mile. This is 3,150 megawatts
incident upon the entire array. The array will capture
80% of this power, or 2,520 megawatts, as hydraulic
energy. If the generating facility associated with the
hydraulic power collecting array is only 50% efficient,
and this is a very low efficiency figure, then the station
will generate 1,260 megawatts. This is more than the
total amount of power generated by the largest nuclear
power reactor presently existing in the United States.

In economic terms, large electric utilities charge on
the order of 1.85¢ per kilowatt hour to heavy industrial
users. (Houston Lighting and Power Company, Decem-
ber, 1975). This figure will be rising over the next few
years as power companies are forced to turn from cheap
sources of fuel such as natural gas, to coal and uranium.
At this rate, 1,200 megawatts is worth $22,200.00 an
hour. Admittedly, the power level generated by the
station will vary, but 1,260 megawatts is an average
figure and, over a year, should represent the average
output of such a generating station.

If such a power station ran 23 hours a day, 360 days
of the year, it would yield 183.8 million dollars worth of
power per year. Such an installation would require
52,800 linear feet of collector array. Such a collector
could certainly be constructed for $10,000 a linear foot.
At $10,000 a linear foot, the collector array would cost
approximately $500,000,000. This is less than the cost of
a nuclear power plant of similar capacity. Even if the
associated hydraulic accumulators and generators cost
on the order of $50,000,000 to $70,000,000, such a
power generating facility should be highly cost effi-
cient. The capital cost per kilowatt of the present inven-
tion would be approximately $450. (The current cost
for nuclear plants is approximately $900 per kilowatt).
Over a 40 year life with no fuel cost, it is clear that the
present invention would make a considerable profit.
Further, its environmental impact would be far less
serious than a conventional or nuclear plant.

The use of such a hydraulic generating array would
also yield a ten mile long strip of calm water. It would
function as a floating breakwater.

It should be understood that the preferred embodi-
ment described above and the examples given in con-
nection therewith merely illustrate one way the concept
of the present invention may be reduced to practical
form. Many other embodiments will quickly be recog-
nized by those skilled in the art. For example, a small
island could be completely surrounded with a collector
array or a collector array in the form of a circle could
be anchored in reasonably deep water to produce a
calm lagoon. The above specification and preferred
embodiment, therefor, should not be considered as lim-
iting the invention. The present invention is limited only
to scope of the appended claims and their equivalents.

I claim:

1. A power gathering array for extracting energy
from wave motion of a fluid, said wave motion having
both an amplitude spectrum and wavelength spectrum,
comprising:

a plurality of differing sized floats, each said float
having a density such that it floats on the surface of
said fluid and moves in response to said wave mo-
tion;

a connecting means for connecting the rear of at least
one first smaller float of said plurality to the front
of at least one second larger float of said plurality,
said connecting means being adapted to allow rela-
tive motion to occur between said first and second
floats responsive to said wave motion when the
two floats are oriented so the smallest float points
into the direction of wave motion;

second connecting means for connecting the rear of
the largest float of said array to a fixed object; and work extracting means responsive to said relative
motion for extracting a unit amount of work from
a unit amount of said relative motion and a non-lin-
early greater number of units of work from each
additional unit of relative motion.

2. A power gathering array according to claim 1
wherein the sizes of said plurality of floats are chosen to allow said floats to dynamically couple into a plurality of wavelengths of said wave motion.

3. A power gathering array according to claim 1 wherein the nonlinear response of said nonlinear work extraction means to said relative motion is adapted to match the amplitude spectrum of said wave motion.

4. A power gathering array according to claim 3 wherein:

each said rear float has a front solid prismatic surface, having an upper and lower fact, whose apex is parallel to the surface of said fluid and proximate the middle of the rear surface of its associated said front float;

said nonlinear work extraction means comprises:

a hollow tubular member proximate at least one face of said prismatic surface and adapted so relative motion of said floats causes a change in the cross section of said tubular member; and said hollow tubular member is filled with fluid and equipped with at least one check value to cause it to function as a pump.

5. A power gathering array according to claim 3 wherein at least two of the plurality of said floats are connected by means of at least one hydraulic cylinder adapted to pump a fluid in response to the relative motion of said floats.

6. A power gathering array according to claim 5 wherein said hydraulic cylinder is a single action hydraulic cylinder mounted on one of said floats, the piston shaft of said hydraulic cylinder being responsive to and operatively connected to said other float via a mechanical linkage adapted to nonlinearly convert the relative motion of said floats to linear motion of said piston shaft.

7. A power gathering array according to claim 1 wherein said plurality of floats increase regularly in length by a scaling factor equal to the nth root of an integer greater than one times the length of the smallest float in the array, n being greater than one.

8. A power gathering array according to claim 7 wherein the smallest float of the array is square and said scaling factor is the cube root of two.

9. A power gathering array according to claim 7 wherein the smallest float in the array is approximately one-half the length of the shortest wavelength wave from which power is to be obtained and the largest float in the array is approximately one-half the length of the longest wavelength wave from which power is to be obtained.

10. A power gathering array according to claim 9 wherein said plurality of floats includes enough floats to trap the wave motion of said fluid as a black body absorber, whereby both the reflected and transmitted energy from any one float of the array would be at least in part absorbed by other floats in the array.

11. A power gathering array as in claim 5 wherein the fluid pumped by said hydraulic cylinder is raised to a higher potential energy level and stored for later use.

12. A power gathering array according to claim 9 wherein said smallest float is approximately from 50 feet to 100 feet long and said largest float is approximately from 200 feet to 400 feet long.

13. A wave generating unit for converting the power of the wave motion of a fluid, said wave motion having an amplitude spectrum and a wavelength spectrum, to mechanical and electrical power comprising:

a plurality of differing sized floats, each said float having a density such that it floats on the surface of said fluid and moves in response to said wave motion;

a connecting means for connecting the rear of at least one first smaller float of said plurality to the front of at least one second larger float of said plurality, said connecting means being adapted to allow relative motion to occur between said first and second floats responsive to said wave motion when the two floats are oriented so the smallest float points into the direction of wave motion;

second connecting means for connecting the rear of the largest float of said array to a fixed object;

work extracting means responsive to said relative motion for extracting a small amount of work from a slight amount of said relative motion and a nonlinearly larger amount of work from each proportionately larger amount of said relative motion; and power conversion means responsive to said nonlinear work extraction means for converting power collected by the extraction means to mechanical and electrical power.

14. A wave powered generating unit as in claim 13 including a plurality of wave generating units, each said unit connecting physically in parallel to prevent any individual unit from becoming disoriented with respect to the direction of wave motion.

15. A wave generating unit according to claim 13 wherein the sizes of each plurality of floats are chosen to allow said floats to dynamically couple into a plurality of wavelengths of said wave motion.

16. A wave generating unit according to claim 13 wherein the nonlinear response of said nonlinear work extraction means to said relative motion is adapted to match the amplitude spectrum of said wave motion.

17. A wave generating unit according to claim 16 wherein:

each said rear float has a front solid prismatic surface, having an upper and lower fact, whose apex is parallel to the surface of said fluid and proximate the middle of the rear surface of its associated said front float;

said nonlinear work extraction means comprises:

a hollow tubular member proximate at least one face of said prismatic surface and adapted so relative motion of said floats causes a change in the cross section of said tubular member; and said hollow tubular member is filled with fluid and equipped with at least one check valve to cause it to function as a pump.

18. A wave generating unit according to claim 16 wherein at least two of the plurality of said floats are connected by means of at least one hydraulic cylinder adapted to pump a fluid in response to the relative motion of said floats.

19. A wave generating unit according to claim 18 wherein said hydraulic cylinder is a single action hydraulic cylinder mounted on one of said floats, the piston shaft of said hydraulic cylinder being responsive to and operatively connected to said other float via a mechanical linkage adapted to nonlinearly conver the relative motion of said floats to linear motion of said piston shaft.

20. A wave generating unit according to 13 wherein said plurality of floats increase regularly in length by a scaling factor equal to the nth root of an integer greater than one time the length of the smallest float in the array, n being greater than one.

21. A wave generating unit according to claim 20 wherein the smallest float of the array is square and said scaling factor is the cube root of two.

22. A wave generating unit according to claim 20 wherein the smallest float in the array is approximately one-half the length of the shortest wavelength wave from which power is to be obtained and the largest float in the array is approximately one-half the length of the longest wavelength wave from which power is to be obtained.

23. A wave generating unit according to claim 22 wherein said plurality of floats includes enough floats to trap the wave motion of said fluid as a black body absorber, whereby both the reflected and transmitted energy from any one float of the array would be at least in part absorbed by other floats in the array.

24. A wave generating unit as in claim 18 wherein the fluid pumped by said hydraulic cylinder is raised to a higher potential energy level and stored for later use.

25. A wave generating unit according to claim 22 wherein said smallest float is approximately from 50 feet to 100 feet long and said largest float is approximately from 200 feet to 400 feet long.

26. A wave generating unit as in claim 16 wherein said power conversion means is a water driven turbine driving an electric generator.

27. A wave generating unit as in claim 26 wherein at least a portion of said power conversion means is mounted on at least one of the floats of said array.

28. A wave generating unit as in claim 27 wherein:

said turbine and generator are housed on the largest float of said array; and electric power from said generator is fed to shore through a subsurface power transmission cable.

29. A wave generating unit as in claim 26 wherein said turbine is a pelton wheel.

30. A wave generating unit as in claim 29 including feedback control means for controlling the flow of water to the pelton wheel adapted to maintain constant water pressure.

*31. A power generating array for extracting energy from wave motion of a fluid, said wave motion having both an amplitude spectrum and a wavelength spectrum comprising:*

*a plurality of differing sized floats, said float sizes chosen to allow said floats to dynamically couple into a plurality of wavelengths of said wave motion, each said float having a density such that it floats in said fluid and moves in response to said wave motion;*

*connecting means for holding said plurality of floats in position relative to one another while allowing said plurality of floats to move in response to said wave motion; and*

*work extracting means responsive to said motion of said floats for extracting a unit amount of work from a unit amount of said motion and a nonlinearly greater number of units of work from each additional unit of motion.*

*32. A power gathering array according to claim 31 wherein the nonlinear response of said work extraction means to said relative motion is adapted to match the amplitude spectrum of said wave motion.*

*33. A power gathering array according to claim 32 wherein said plurality of floats differ in length by a scaling factor equal to the nth root of an integer greater than one times the length of the smallest float in the array, n being greater than one.*

*34. A power gathering array according to claim 33 wherein the smallest float of the array is square and said scaling factor is the cube root of two.*

*35. A power gathering array according to claims 31, 32, 33 or 34 wherein the smallest float in the array is approximately one-half the length of the shortest wavelength wave from which power is to be obtained and the largest float in the array is approximately one-half the length of the longest wavelength wave from which power is to be obtained.*

*36. A power gathering array according to claims 31, 32, 33 or 34 wherein said plurality of floats includes enough floats to trap the wave motion of said fluid as a black body absorber, whereby both the reflected and transmitted energy from any one float of the array would be at least in part absorbed by other floats in the array.*

*37. A power gathering array as in claim 36 wherein the fluid pumped by said hydraulic cyliner is raised to a higher potential energy level and stored for later use.*

*38. A power gathering array according to claim 35 wherein said smallest float is approximately from* 50 feet to 100 feet long and said largest float is approximately from 200 feet to 400 feet long.

*39. A power gathering array according to claim 38 wherein said work extracting means is a plurality of hydraulic cylinders, said cylinders being responsive to and operatively connected to between said floats and a fixed object via a mechanical linkage adapted to nonlinearly convert the relative motion of said floats to linear motion of said piston.*

*40. A power gathering array for extracting energy from wave motion of a fluid, said wave motion having both an amplitude spectrum and a wavelength spectrum comprising:*

*a plurality of differing sized floats, said float sizes chosen to allow said floats to dynamically couple into a plurality of wavelengths of said wave motion, each said float having a density such that it floats in said fluid and moves in response to said wave motion;*

*connecting means for holding said plurality of floats in position relative to one another while allowing said plurality of floats to move in response to said wave motion;*

*work extracting means responsive to said motion of said floats for extracting a unit amount of work from a unit amount of said motion and a nonlinearly greater number of units of work from each additional unit of motion; and*

*power conversion means responsive to said nonlinear work extraction means for converting power collected by the extraction means to mechanical and electrical power.*

*41. A wave powered generating unit as in claim 40 including a plurality of wave generating units, each said unit connecting physically in parallel to prevent any individual unit from becoming disoriented with respect to the direction of wave motion.*

*42. A wave generating unit according to claim 40 wherein the sizes of each plurality of floats are chosen to allow said floats to dynamically couple into a plurality of wavelengths of said wave motion.*

*43. A wave generating unit according to claim 40 wherein the nonlinear response of said nonlinear work extraction means to said relative motion is adapted to match the amplitude spectrum of said wave motion.*

*44. A wave generating unit according to claim 43 wherein the smallest float of the array is square and said scaling factor is the cube root of two.*

*45. A wave generating unit according to claim 44 wherein the smallest float in the array is approximately one-half the length of the shortest wavelength wave from which power is to be obtained and the largest float in the array is approximately one-half the length of the longest wavelength wave from which power is to be obtained.*

*46. A wave generating unit according to claim 45 wherein said plurality of floats includes enough floats to trap the wave motion of said fluid as a black body absorber, whereby both the reflected and transmitted energy from any one float of the array would be at least in part absorbed by other floats in the array.*

*47. A wave generating unit according to claim 45 wherein said smallest float is approximately from 50 feet to 100 feet long and said largest float is approximately from 200 feet to 400 feet long.*

*48. A wave generating unit as in claim 40 wherein said power conversion means is a water driven turbine driving an electric generator.*

*49. A wave generating unit as in claim 48 wherein at least a portion of said power conversion means is mounted on at least one of the floats of said array.*

*50. A wave generating unit as in claim 49 wherein:*

*said turbine and generator are housed on the largest float of said array; and*

*electric power from said generator is fed to shore through a subsurface power transmission cable.*

*51. A wave generating unit as in claim 48 wherein said turbine is a pelton wheel.*

*52. A wave generating unit as in claim 51 including feedback control means for controlling the flow of water to the pelton wheel adapted to maintain constant water pressure.*

* * * * *